US008944097B2

(12) United States Patent
Yamamoto

(10) Patent No.: US 8,944,097 B2
(45) Date of Patent: Feb. 3, 2015

(54) DECOMPRESSION VALVE

(75) Inventor: Hiroaki Yamamoto, Miyagi (JP)

(73) Assignee: Keihin Corporation, Tokyo (JP)

( * ) Notice: Subject to any disclaimer, the term of this patent is extended or adjusted under 35 U.S.C. 154(b) by 637 days.

(21) Appl. No.: 13/257,853

(22) PCT Filed: Feb. 10, 2010

(86) PCT No.: PCT/JP2010/051932
§ 371 (c)(1),
(2), (4) Date: Sep. 20, 2011

(87) PCT Pub. No.: WO2010/116788
PCT Pub. Date: Oct. 14, 2010

(65) Prior Publication Data
US 2012/0012200 A1 Jan. 19, 2012

(30) Foreign Application Priority Data
Mar. 30, 2009 (JP) .................................. 2009-083510

(51) Int. Cl.
*G05D 16/06* (2006.01)
*F16K 1/36* (2006.01)
(Continued)

(52) U.S. Cl.
CPC . *F16K 1/36* (2013.01); *F16K 17/30* (2013.01); *F16K 27/02* (2013.01); *G05D 16/0658* (2013.01)
USPC ............ 137/505.18; 137/505.11; 137/505.14; 137/505.37; 137/505.41; 137/505.42

(58) Field of Classification Search
CPC .......... G05D 16/0663; G05D 16/0666; G05D 16/0669; G05D 16/0655; G05D 16/0658; G05D 16/0661
USPC ............ 137/505.18, 505.26, 505.36, 505.37, 137/505.11, 505.14, 505.41, 505.42
See application file for complete search history.

(56) References Cited

U.S. PATENT DOCUMENTS 2,707,966 A * 5/1955 Taplin ..................... 137/116.5
2,731,975 A * 1/1956 Boals ...................... 137/116.5
(Continued)

FOREIGN PATENT DOCUMENTS

CN 1918525 A 2/2007
CN 201028076 Y 2/2008
(Continued)

OTHER PUBLICATIONS

Chinese language Official Communication, Dec. 3, 2012.

*Primary Examiner* — William McCalister
(74) *Attorney, Agent, or Firm* — Arent Fox LLP

(57) ABSTRACT

In a decompression valve, a valve mechanism housed in a body has a valve body that can be seated on a valve seat facing a valve chamber into which high pressure fluid is introduced, and a valve shaft that has one end linked to a pressure receiving member operable in association with pressure of a decompression chamber communicating with a valve hole surrounded by the valve seat and that extends through the valve hole while having the other end facing a back pressure chamber communicating with the decompression chamber, and the valve body is fitted around the outer periphery of the valve shaft. The valve body (36) is fitted around the outer periphery of the valve shaft (35) while allowing circulation of fluid between the valve chamber (32) and the back pressure chamber (65) via a space between the valve body (36) and the valve shaft (35), and an annular seal member (46) present between the valve chamber (32) and the back pressure chamber (65) is disposed between the outer periphery of the valve body (36) and a guide member (30) fixed to the body (16) so as to guide axial movement of the valve shaft (35). Accordingly, it is possible to reduce a number of seal members for providing sealing between a valve chamber and a decompression chamber and thus to reduce the cost.

7 Claims, 8 Drawing Sheets

(51) Int. Cl.
*F16K 17/30* (2006.01)
*F16K 27/02* (2006.01)

(56) References Cited

U.S. PATENT DOCUMENTS

| | | | | |
|---|---|---|---|---|
| 2,761,464 A | * | 9/1956 | Faust | 137/116.5 |
| 3,198,481 A | * | 8/1965 | Bryant | 251/210 |
| 3,251,376 A | * | 5/1966 | Worden | 137/484.8 |
| 3,926,208 A | * | 12/1975 | Hoffman | 137/484.8 |
| 4,760,862 A | * | 8/1988 | Mutou et al. | 137/315.05 |
| 5,595,209 A | * | 1/1997 | Atkinson et al. | 137/116.5 |
| 6,079,434 A | * | 6/2000 | Reid et al. | 137/14 |
| 7,157,168 B2 | * | 1/2007 | Nakajima et al. | 429/444 |
| 2009/0320935 A1 | * | 12/2009 | Yamamoto et al. | 137/505.39 |

FOREIGN PATENT DOCUMENTS

| | | |
|---|---|---|
| JP | 2003-316444 A | 11/2003 |
| JP | 2005-307972 A | 11/2005 |
| JP | 2008-267558 A | 11/2008 |
| JP | 2008-269459 A | 11/2008 |

* cited by examiner

DECOMPRESSION VALVE

CROSS-REFERENCED TO RELATED APPLICATION

This application is a National Stage entry of International Application No. PCT/JP 2010/051932, filed Feb. 10, 2010, which claims priority to Japanese Patent Application No. 2009-083510, filed Mar. 30, 2009, the duty of disclosure of the prior application in its entirety by reference.

TECHNICAL FIELD

The present invention relates to a decompression valve in which a valve mechanism housed in a body includes a valve body that can be seated on a valve seat facing a valve chamber into which high pressure fluid is introduced, and a valve shaft that has one end linked to a pressure receiving member operable in association with the pressure of a decompression chamber communicating with a valve hole surrounded by the valve seat and that extends through the valve hole while having the other end facing a back pressure chamber communicating with the decompression chamber, the valve body being fitted around the outer periphery of the valve shaft.

BACKGROUND ART

A decompression valve in which a valve body is fitted around the outer periphery of a valve shaft with an O ring disposed between the valve body and the valve shaft, the O ring providing sealing between a valve chamber and a decompression chamber, and the O ring is disposed between the valve shaft and a guide member for guiding axial movement of the valve shaft, is known from Patent Document 1.
Patent Document 1: Japanese Patent Application Laid-open No. 2008-267558

DISCLOSURE OF INVENTION

Problems to be Solved by the Invention

However, the arrangement disclosed in Patent Document 1 above requires an O ring between the valve body and the valve shaft in order to hermetically isolate the valve chamber from the decompression chamber, thus increasing the number of components and resulting in high cost. Moreover, due to the O ring being disposed between the valve body and the valve shaft, the shape of a part where the valve shaft and the valve body are joined becomes complicated, and the machining cost is also high.

The present invention has been accomplished in light of such circumstances, and it is an object thereof to provide a decompression valve that does not require a seal member for providing sealing between a valve chamber and a decompression chamber and can thus reduce the cost.

Means for Solving the Problems

In order to attain the above object, according to a first aspect of the present invention, there is provided a decompression valve in which a valve mechanism housed in a body comprises a valve body that can be seated on a valve seat facing a valve chamber into which high pressure fluid is introduced, and a valve shaft that has one end linked to a pressure receiving member operable in association with pressure of a decompression chamber communicating with a valve hole surrounded by the valve seat and that extends through the valve hole while having the other end facing a back pressure chamber communicating with the decompression chamber, the valve body being fitted around the outer periphery of the valve shaft, characterized in that the valve body is fitted around the outer periphery of the valve shaft while allowing circulation of fluid between the valve chamber and the back pressure chamber via a space between the valve body and the valve shaft, and an annular seal member present between the valve chamber and the back pressure chamber is disposed between a guide member and the outer periphery of the valve body, the guide member being fixed to the body so as to guide movement, in an axial direction, of the valve shaft.

Furthermore, according to a second aspect of the present invention, in addition to the configuration of the first aspect, the seal member is mounted on the guide member so as to be in resilient sliding contact with the outer periphery of the valve body.

Moreover, according to a third aspect of the present invention, in addition to the configuration of the first or second aspect, a valve body mounting shaft portion having on the outer periphery of one end a retaining groove with which the valve body engages is provided in part of the valve shaft, which is made of metal, so as to make the valve body fit therewith, and the valve body mounting shaft portion is formed so as to have the same cross-sectional shape along the whole length in the axial direction apart from a section of the retaining groove.

Furthermore, according to a fourth aspect of the present invention, in addition to the configuration of any one of the first to third aspects, a first cutout is provided so as to extend in the axial direction on at least one of the inner periphery of the valve body and the outer periphery of the valve shaft, the first cutout forming a first passage part between the valve body and the valve shaft, and the first passage part being part of a back pressure infeed path providing a connection between the decompression chamber and the back pressure chamber.

Moreover, according to a fifth aspect of the present invention, in addition to the configuration of the fourth aspect, the valve shaft integrally has a guide shaft portion slidably fitted into a guide hole provided in the guide member, and a second cutout is provided so as to extend in the axial direction on at least one of the outer periphery of the guide shaft portion and the inner periphery of the guide hole, the second cutout forming a second passage part between the guide member and the valve shaft, and the second passage part forming part of the back pressure infeed path and providing a connection between the first passage part and the back pressure chamber.

Furthermore, according to a sixth aspect of the present invention, in addition to the configuration of the fifth aspect, the guide hole is formed so as to have a smaller diameter than a sealing diameter of the valve body by the seal member.

Moreover, according to a seventh aspect of the present invention, in addition to the configuration of any one of the first to sixth aspects, the valve body is formed from a synthetic resin.

Furthermore, according to an eighth aspect of the present invention, in addition to the configuration of the seventh aspect, high pressure compressed natural gas is introduced into the valve chamber.

Here, a diaphragm 28 of an embodiment corresponds to the pressure receiving member of the present invention, and a third seal member 46 of the embodiment corresponds to the seal member of the present invention.

Effects of the Invention

In accordance with the first aspect of the present invention, the annular seal member present between the valve chamber and the back pressure chamber is disposed between the guide member guiding movement, in the axial direction, of the valve body and valve shaft and the outer periphery of the valve body fitted around the outer periphery of the valve shaft, and the valve body is fitted around the outer periphery of the valve shaft so as to allow circulation of fluid between itself and the valve shaft. Accordingly, it is unnecessary for there to be disposed between the valve body and the valve shaft a seal member for providing sealing between the valve chamber and the decompression chamber, thus reducing the number of components and achieving a reduction in cost. Moreover, since no seal member is disposed between the valve body and the valve shaft, it is possible to simplify the shapes of the outer periphery of the valve shaft and the inner periphery of the valve body.

In accordance with the second aspect of the present invention, since the seal member is mounted on the guide member so as to be in resilient sliding contact with the outer periphery of the valve body, it is possible to further simplify the shape of the valve body.

In accordance with the third aspect of the present invention, within the metal valve shaft the cross-sectional shape of the valve body mounting shaft portion, onto which the valve body is fitted, is the same along the whole length in the axial direction apart from the retaining groove, with which the valve body is engaged. Accordingly, when making the valve shaft by machining a metal substrate, it is possible to reduce a portion that is removed by machining, thus achieving a reduction in processing cost and material cost.

In accordance with the fourth aspect of the present invention, the first passage part, which is part of the back pressure infeed path providing a connection between the decompression chamber and the back pressure chamber, is formed from the first cutout provided in at least one of the inner periphery of the valve body and the outer periphery of the valve shaft and extending in the axial direction. Accordingly, the back pressure infeed path can be formed simply and inexpensively and, furthermore, it is unnecessary to ensure there is space for forming the back pressure infeed path on the body side, thus achieving a reduction in the size of the body.

In accordance with the fifth aspect of the present invention, the second cutout, which forms between the guide member and the valve shaft the second passage part forming part of the back pressure infeed path and being disposed between the first passage part and the back pressure chamber, is provided so as to extend in the axial direction in at least one of the outer periphery of the guide shaft portion that is integral with the valve shaft and the inner periphery of the guide hole provided in the guide member so as to have the guide shaft portion slidably fitted thereinto. Accordingly, the back pressure infeed path can be formed simply together with the first passage part.

In accordance with the sixth aspect of the present invention, since the guide hole has a smaller diameter than the sealing diameter of the valve body by the seal member, even if the ratio (sliding section length/guide diameter) of the guide diameter, which is the diameter of the guide hole guiding the valve body and the valve shaft, and the length of the sliding section of the valve shaft is ensured so as not to cause tilting and galling of the valve shaft and the valve body, a short length can be set for the sliding section, thus achieving a reduction in the size of the decompression valve. That is, in order to prevent the occurrence of tilting and galling of the valve shaft and the valve body, the sliding section length/ guide diameter is generally set at a certain fixed value or greater, and the sliding section length can be made small by setting a small guide diameter. Moreover, even when the guide diameter and the sealing diameter are different, since the back pressure infeed path is formed between the valve shaft and the valve body and between the valve shaft and the guide member, it is possible to apply back pressure to the entire end faces of the valve shaft and the valve body on the side opposite to the pressure receiving member by means of a simple arrangement.

In accordance with the seventh aspect of the present invention, since the valve body is formed from a synthetic resin, it is possible to ensure the durability of the valve body against high pressure and the seating properties.

Moreover, in accordance with the eighth aspect of the present invention, since compressed natural gas is decompressed, a synthetic resin valve body can be used most suitably.

EXPLANATION OF REFERENCE NUMERALS AND SYMBOLS

Figure 1:
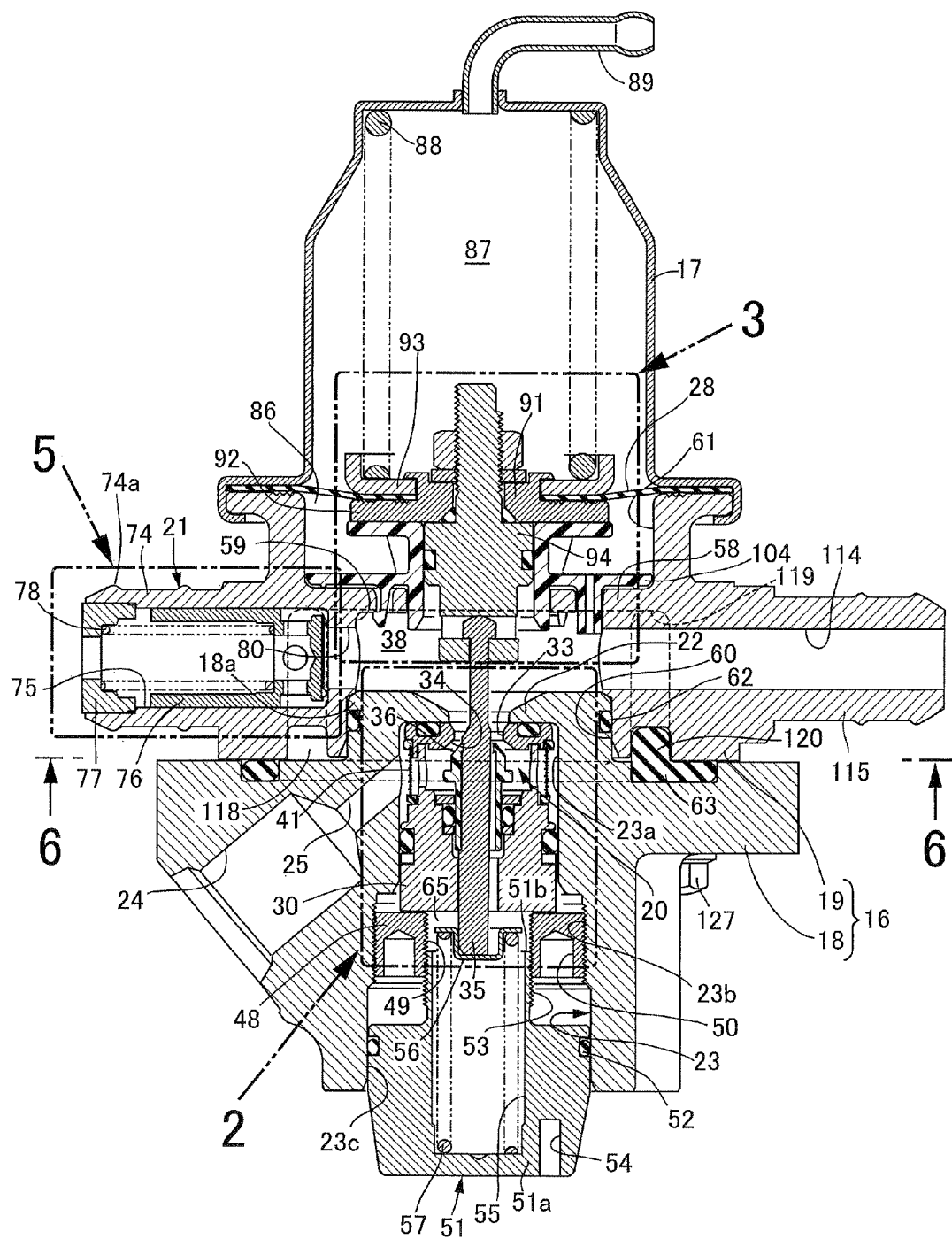
FIG. 1 is a longitudinal sectional view of a decompression valve for gas. (first embodiment)

16 . . . Body
20 . . . Valve mechanism
28 . . . Diaphragm, which is a pressure receiving member
32 . . . Valve chamber
33 . . . Valve hole
34 . . . Valve seat
35 . . . Valve shaft
35*a* . . . Valve body mounting shaft portion
35*c* . . . Guide shaft portion
36 . . . Valve body
38 . . . Decompression chamber
43 . . . Retaining groove
45 . . . Guide hole
46 . . . Third seal member, which is a seal member
65 . . . Back pressure chamber
66 . . . Back pressure infeed path
67 . . . First passage part
68 . . . Second passage part
69 . . . First cutout
70 . . . Second cutout

BEST MODE FOR CARRYING OUT THE INVENTION

A mode for carrying out the present invention is explained below by reference to the attached drawings.

First Embodiment

Embodiment 1 of the present invention is explained by reference to FIG. 1 to FIG. 8; first, in FIG. 1, this decompression valve for gas is for decompressing compressed natural gas, which is fuel gas, and supplying it to an engine (not illustrated) and comprises a body 16 that is formed by joining first and second body members 18 and 19 to each other, and a diaphragm cover 17 that is formed by press-forming thin metal and is connected to the body 16, a valve mechanism 20 being housed in the body 16, and a relief valve 21 being disposed on the body 16.

The body 16 is formed by vertically superimposing the first and second body members 18 and 19 and securing them at a plurality of positions. A housing hole 23 is provided in a central part of the first body member 18, the housing hole 23 extending vertically while having a radially inwardly protruding inward flange 22 at the upper end. This housing hole 23 is formed by coaxially connecting, in sequence from the inward flange 22 side, a small diameter hole 23a, a threaded hole 23b having a larger diameter than the small diameter hole 23a, and a large diameter hole 23c having a larger diameter than the threaded hole 23b, and the lower end of the large diameter hole 23c opens downward on a lower end face of the first body member 18.

A gas inlet 24 for introducing compressed natural gas prior to decompression is provided on a lower side face of the first body member 18, and a high pressure passage 25 communicating coaxially with the gas inlet 24 is provided in the first body member 18.

Figure 2:
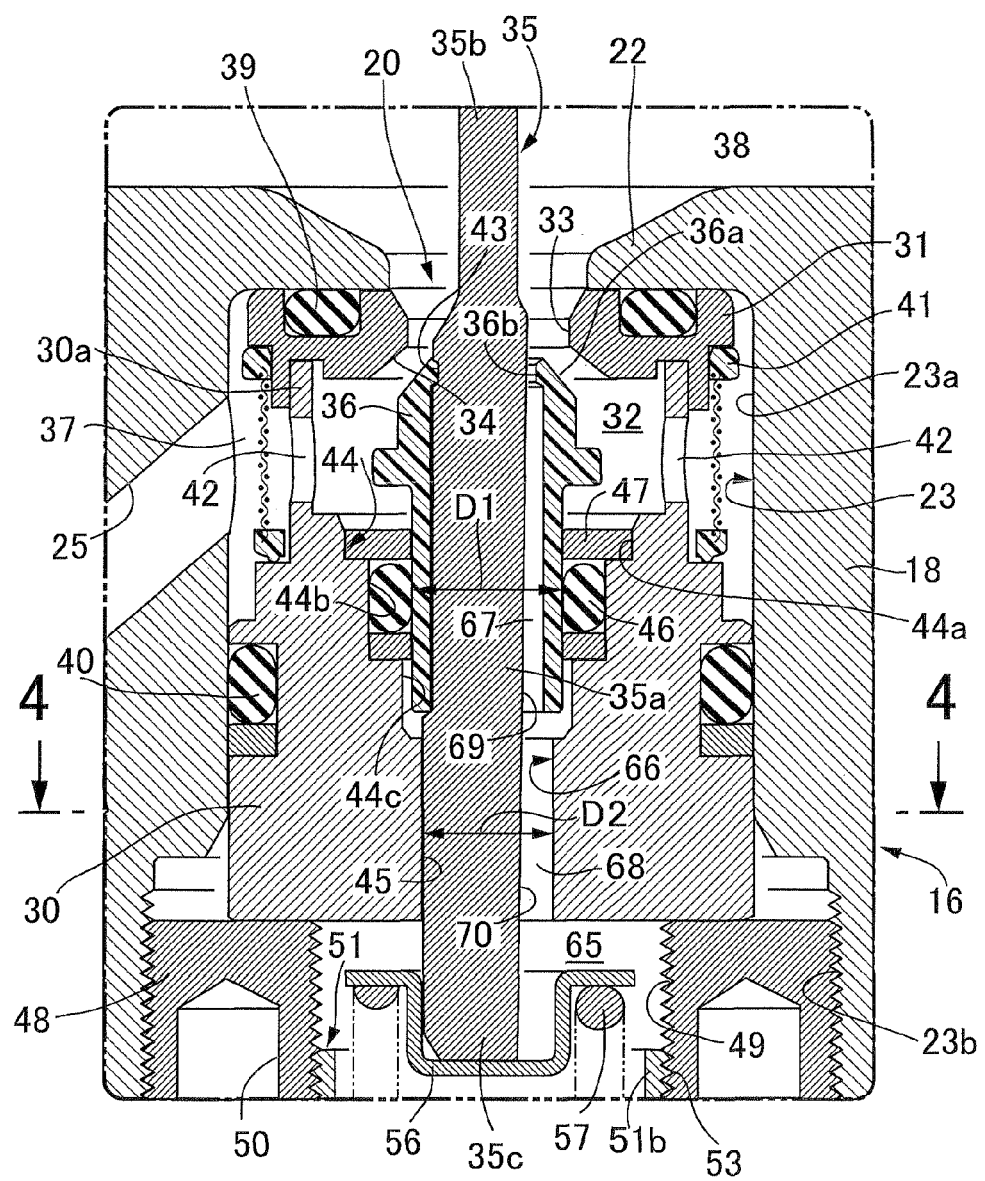
FIG. 2 is an enlarged view of a part shown by an arrow 2 in FIG. 1. (first embodiment)

Referring in addition to FIG. 2, the valve mechanism 20 is driven by a diaphragm 28 and includes a guide member 30 that is made of metal and is hermetically fitted into and fixed to the small diameter hole 23a of the housing hole 23, a valve seat member 31 that is connected to the guide member 30 so as to form a valve chamber 32 between itself and the guide member 30, and is provided with a valve seat 34 having a valve hole 33 in a central part and facing the valve chamber 32, a valve shaft 35 that is slidably fitted into the guide member 30 while extending loosely through the valve hole 33, and a valve body 36 that is made of a synthetic resin and is fitted onto the outer periphery of the valve shaft 35 within the valve chamber 32 so as to be seated on the valve seat 34. The valve mechanism 20 is mounted in the first body member 18 while being housed in the body 16 so as to be present between a high pressure chamber 37 communicating with the valve chamber 32 and a decompression chamber 38 communicating with the valve hole 33, and the high pressure passage 25 communicates with the high pressure chamber 37.

A cylindrical portion 30a extending toward the valve seat member 31 side is provided integrally with the outer periphery of an end part, on the valve seat member 31 side, of the guide member 30, and an extremity part of this cylindrical portion 30a is pressed into the valve seat member 31 so that the extremity abuts against the valve seat member 31. Furthermore, a face, on the inward flange 22 side, of the valve seat member 31 is equipped with an annular first seal member 39 surrounding the valve hole 33 so as to be in intimate contact with the inward flange 22, and the valve chamber 32 is formed between the valve seat member 31 and the guide member 30 so that the outer periphery is defined by the cylindrical portion 30a.

The high pressure chamber 37, which is annular, is formed between the inner periphery of the small diameter hole 23a in the housing hole 23 and the outer periphery of the valve seat member 31 and outer periphery of the end part, on the valve seat member 31 side, of the guide member 30, and the outer periphery of the guide member 30 is equipped with an annular second seal member 40 that is in resilient contact with the inner periphery of the small diameter hole 23a.

Furthermore, a cylindrical filter 41 present between the high pressure chamber 37 and the valve chamber 32 is held between the guide member 30 and the valve seat member 31 so as to surround the cylindrical portion 30a of the guide member 30, and a plurality of through holes 42 for introducing into the valve chamber 32 high pressure gas that has passed through the filter 41 from the high pressure chamber 37 are provided in the cylindrical portion 30a.

The valve shaft 35 integrally has a valve body mounting shaft portion 35a, a linking shaft portion 35b formed so as to have a smaller diameter than the valve body mounting shaft portion 35a and connected coaxially to one end of the valve body mounting shaft portion 35a, and a guide shaft portion 35c formed so as to have a slightly larger diameter than the valve body mounting shaft 35a portion and connected coaxially to the other end of the valve body mounting shaft portion 35a. The linking shaft portion 35b extends loosely through the valve hole 33 and is linked to the diaphragm 28 side, and the guide shaft portion 35c is slidably fitted into the guide member 30.

The valve body 36 is formed into a cylindrical shape so as to be mounted on and fixed to the outer periphery of the valve body mounting shaft portion 35a of the valve shaft 35; formed at one end of the valve body 36 are a tapered seal face 36a that can be seated on the valve seat 34 and an annular projection 36b resiliently engaging with an annular retaining groove 43 provided on the outer periphery of one end of the valve body mounting shaft portion 35a.

An insertion hole 44 and a guide hole 45 are provided in the guide member 30 so as to be coaxially linked to each other, part of the valve body 36 mounted on the valve body mounting shaft portion 35a of the valve shaft 35 being inserted into the insertion hole 44, and the guide hole 45 being formed with a smaller diameter than the insertion hole 44 so that the guide shaft portion 35c of the valve shaft 35 is slidably fitted thereinto.

The insertion hole 44 is formed by coaxially connecting, in sequence from the valve chamber 32 side, a large diameter hole 44a, a medium diameter hole 44b having a smaller diameter than the large diameter hole 44a, and a small diameter hole 44c having a smaller diameter than the medium diameter hole 44b. An annular third seal member 46 in resilient sliding contact with the outer periphery of the valve body 36 is inserted into the medium diameter hole 44b, and a ring plate-shaped retaining plate 47 for preventing the third seal member 46 from detaching from the medium diameter hole 44b is press fitted into the large diameter hole 44a. That is, the guide member 30 is equipped with the third seal member 46 in resilient sliding contact with the outer periphery of the valve body 36.

Furthermore, the guide hole 45 is formed so as to have a smaller diameter than the small diameter hole 44c of the insertion hole 44 and have a smaller diameter than the diameter of the outer periphery of the valve body 36, with which the third seal member 46 is in sliding contact, and a guide diameter D2, which is the diameter of the guide hole 45, is set at a smaller diameter than a sealing diameter D1 of the valve body 36 by the third seal member 46.

Referring again to FIG. 1, a ring-shaped retaining member 48 abutting against the guide member 30 and holding the guide member 30 and the valve seat member 31 between itself and the inward flange 22 is screwed into the threaded hole 23b of the housing hole 23. Provided in this retaining member 48 is a threaded hole 49 having a larger diameter than the guide shaft portion 35c of the valve shaft 35, the threaded hole 49 being coaxial with the valve shaft 35 so as to have an end part of the guide shaft portion 35c inserted thereinto. Moreover, an end face, on the side opposite to the guide member 30, of the retaining member 48 is provided with a bottomed engagement hole 50, a tool (not illustrated) for rotating the retaining member 48 in order to screw it into the threaded hole 23b being detachably engaged with the engagement hole 50.

A lower end opening of the housing hole 23 is hermetically closed by an adjustment member 51. This adjustment member 51 has a large diameter portion 51a and a small diameter portion 51b. The large diameter portion 51a is fitted into the large diameter hole 23c with the outer periphery of the large diameter portion 51a equipped with an annular fourth seal member 52 in resilient contact with an inner face of the large diameter hole 23c in the housing hole 23. The small diameter portion 51b is formed so as to have a smaller diameter than the large diameter portion 51a and is provided integrally and coaxially with the large diameter portion 51a with a male thread 53, which is to be screwed into the threaded hole 49 of the retaining member 48, cut on the outer periphery of the small diameter portion 51b. The outer end of the large diameter portion 51a is provided with a bottomed engagement hole 54 for a tool, which is not illustrated, to engage with. Engaging a tool with the engagement hole 54 in a state in which the male thread 53 is screwed into the threaded hole 49 of the retaining member 48 and rotating the tool enables the adjustment member 51 to move back-and-forth in a direction along an axis that is coaxial with the valve shaft 35.

Furthermore, a bottomed housing recess 55 opening toward the valve shaft 35 side is provided in the adjustment member 51 coaxially with the valve shaft 35, and a rear coil spring 57 is provided in a compressed state between the closed end of the housing recess 55 and a spring bearing member 56 abutting against an end part of the guide shaft portion 35c of the valve shaft 35. The spring load of the rear coil spring 57 can be adjusted by adjusting the back-and-forth position of the adjustment member 51 along the axial direction by rotating the adjustment member 51.

Figure 3:
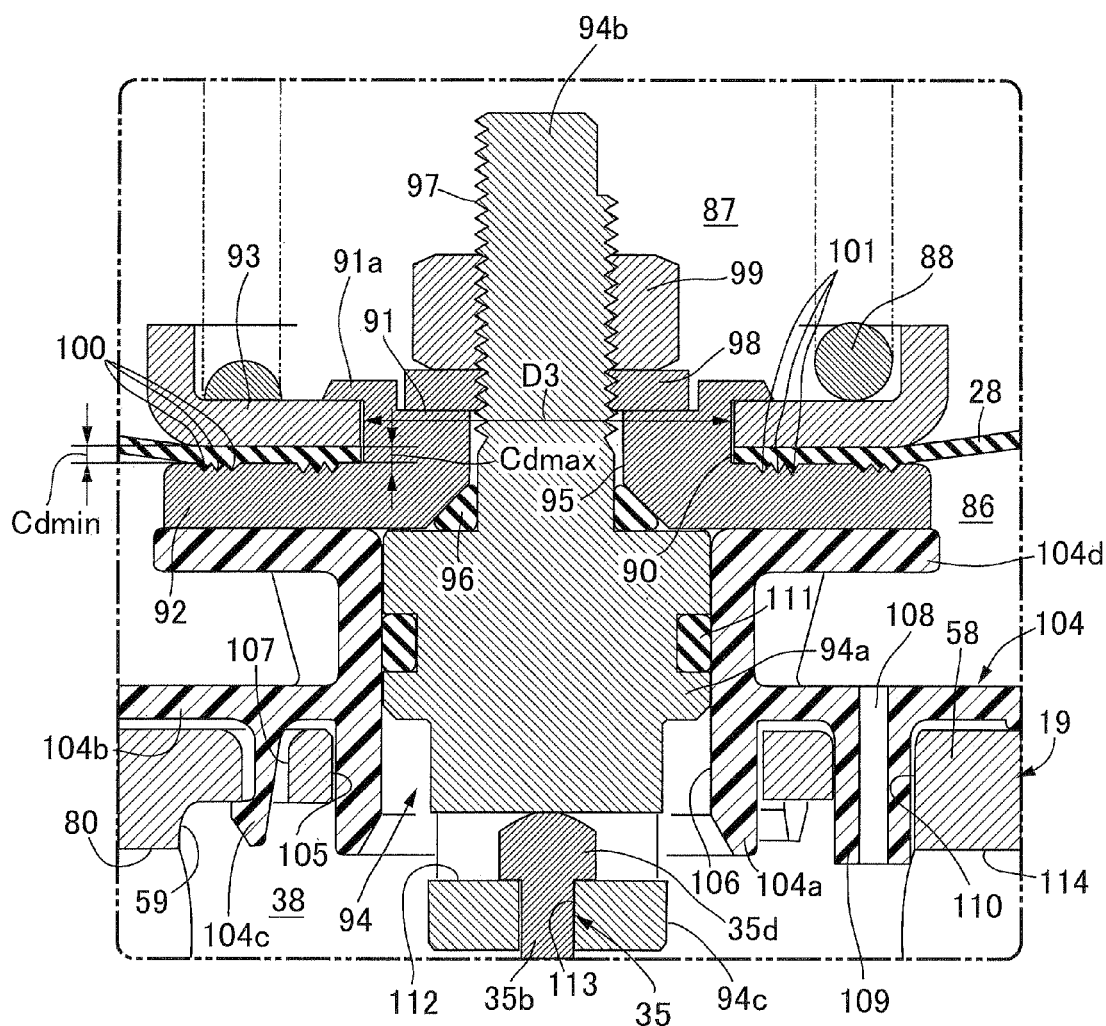
FIG. 3 is an enlarged view of a part shown by an arrow 3 in FIG. 1. (first embodiment)

Referring in addition to FIG. 3, provided on the second body member 19 is a wall part 58 that is positioned in a middle part along the axis of the valve mechanism 20 disposed on the first body member 18 side and that follows a plane perpendicular to the axis of the valve mechanism 20; and provided, in sequence from the wall part 58 side, on the second body member 19 on the first body member 18 side relative to the wall part 58 are a decompression chamber-forming hole 59 and a fitting hole 60, the fitting hole 60 having a larger diameter than the decompression chamber-forming hole 59. The decompression chamber-forming hole 59 and the fitting hole 60 communicates mutually and coaxially with the housing hole 23 provided in the first body member 18; and provided in the second body member 19 on the side opposite to the first body member 18 relative to the wall part 58 and coaxially with the decompression chamber-forming hole 59 and the fitting hole 60 is a pressure action chamber-forming hole 61.

On the other hand, as shown in FIG. 1, a circular cross-section fitting projection 18a, which is coaxial with the housing hole 23, is projectingly provided integrally with the first body member 18, and this fitting projection 18a is fitted into the fitting hole 60. The outer periphery of the fitting projection 18a is equipped with an annular fifth seal member 62 in resilient contact with the inner periphery of the fitting hole 60, and the fitting projection 18a is hermetically fitted into the fitting hole 60.

In a state in which the fitting projection 18a is fitted into the fitting hole 60, the first and second body members 18 and 19 are joined with an annular sixth seal member 63 present therebetween, the first body member 18 being equipped with the sixth seal member 63 so as to surround the fitting projection 18a. In a state in which the first and second body members 18 and 19 are joined, the decompression chamber 38 is formed between the wall part 58 and the extremity of the fitting projection 18a, the outer periphery of the decompression chamber 38 being defined by the decompression chamber-forming hole 59. This decompression chamber 38 communicates with the valve hole 33 of the valve mechanism 20.

Incidentally, a back pressure chamber 65 is formed within the housing hole 23 having the open end hermetically closed by the adjustment member 51, an end part of the guide shaft portion 35c of the valve shaft 35 of the valve mechanism 20 facing the back pressure chamber 65. This back pressure chamber 65 is hermetically isolated from the annular high pressure chamber 37 formed between the first body member 18 and the guide member 30 and valve seat member 31 within the small diameter hole 23a because the second seal member 40, with which the outer periphery of the guide member 30 is equipped, is in resilient contact with an inner face of the small diameter hole 23a in the housing hole 23 and the third seal member 46, with which the guide member 30 is equipped, is in resilient contact with the outer periphery of the valve body 36.

The back pressure chamber 65 communicates with the decompression chamber 38 via a back pressure infeed path 66, and this back pressure infeed path 66 is formed from the valve hole 33, a first passage part 67 formed between the valve body 36 and the valve body mounting shaft portion 35a of the valve shaft 35, and a second passage part 68 formed between the guide member 30 and the guide shaft portion 35c of the valve shaft 35 so as to provide a connection between the first passage part 67 and the back pressure chamber 65.

The first passage part 67 is formed by providing an axially extending flat first cutout 69 on at least one of the inner periphery of the valve body 36 and the outer periphery of the valve body mounting shaft portion 35a of the valve shaft 35, in this Embodiment 1 the outer periphery of the valve body mounting shaft portion 35a. The valve body 36 is fitted onto the valve body mounting shaft portion 35a of the valve shaft 35 so as to form a flow of fluid from the decompression chamber 38 to the back pressure chamber 65 between itself and the valve shaft 35, and the valve body mounting shaft portion 35a is formed so as to have the same cross-sectional shape along its whole length in the axial direction apart from the retaining groove 43 at one end thereof.

Figure 4:
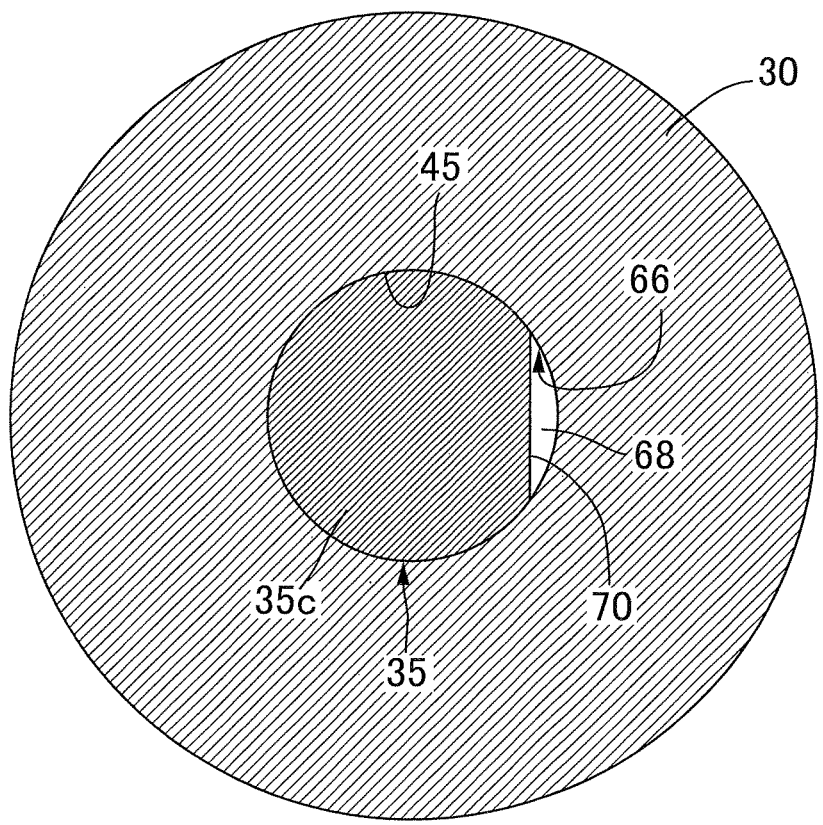
FIG. 4 is an enlarged sectional view taken along a line 4-4 in FIG. 2. (first embodiment)

The second passage part 68 is formed by providing a flat second cutout 70 so as to extend in the axial direction on at least one of the outer periphery of the guide shaft portion 35c of the valve shaft 35 and the inner periphery of the guide member 30, in this Embodiment 1 as shown in FIG. 4, on the outer periphery of the guide shaft portion 35c, and the first and second cutouts 69 and 70 are formed as flat faces so as to be connected flush to each other.

Figure 5:
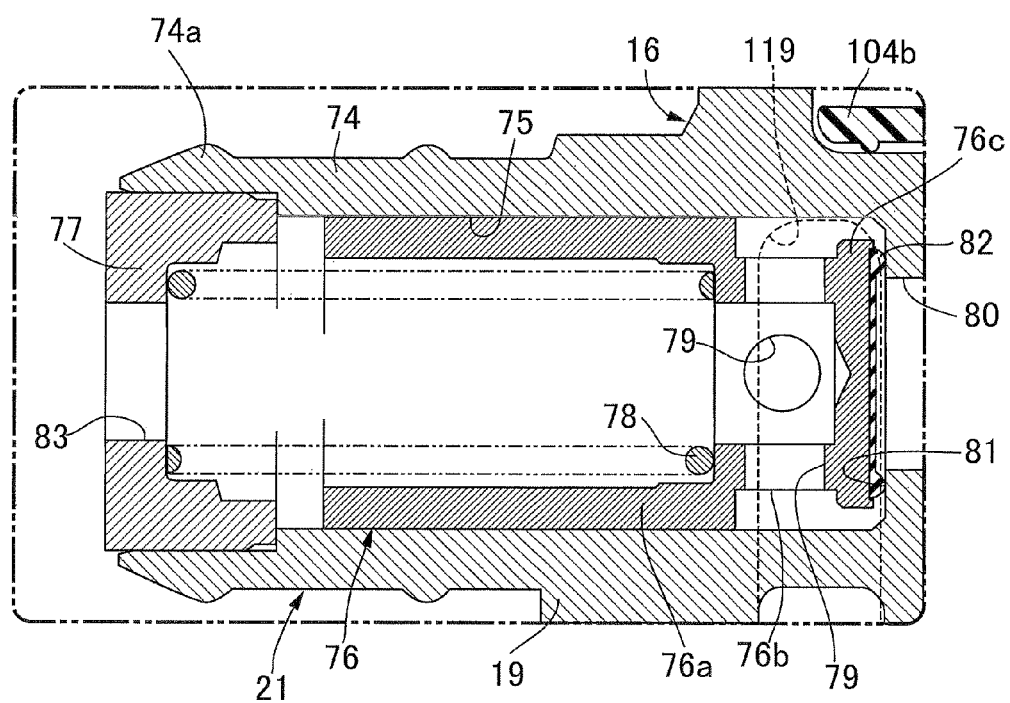
FIG. 5 is an enlarged view of a part shown by an arrow 5 in FIG. 1. (first embodiment)

Focusing on FIG. 5, the relief valve 21 opens in response to the pressure within the decompression chamber 38 attaining a set pressure or greater, and includes a cylindrical joint part 74, a relief valve body 76, a cap 77, and a coil spring 78, the joint part 74 being formed into a cylindrical shape so that a hose can be connected thereto and being provided integrally with the second body member 19 of the body 16 so that a retaining portion 74a for retaining the hose is formed on the outer periphery, the joint part 74 having coaxially therewith a slide hole 75 into which the relief valve body 76 is slidably fitted, the cap 77 being fitted and fixed to an outer end part of the slide hole 75, and the coil spring 78 being provided between the relief valve body 76 and the cap 77.

The relief valve body 76 integrally has a cylindrical sliding tubular portion 76a slidably fitted into the slide hole 75, a cylindrical linking tubular portion 76b formed so as to have a smaller diameter than the sliding tubular portion 76a and connected coaxially to one end of the sliding tubular portion 76a, and a circular plate portion 76c closing one end of the linking tubular portion 76b and having its outer periphery protruding radially further outward than the outer periphery of the linking tubular portion 76b, and a plurality of through holes 79 are provided in the linking tubular portion 76b.

The inner end of the slide hole 75 is provided with an annular relief valve seat 81 having a relief valve hole 80 opened in a central part thereof, the relief valve hole 80 communicating with the decompression chamber 38. An annular seat member 82 made of for example rubber is adhered to the circular plate portion 76c at the inner end of the relief valve body 76 so that it can be seated on the relief valve seat 81 and closes the relief valve hole 80.

The cap 77 is fixed to the joint part 74 by for example press fitting into the outer end of the slide hole 75, and is provided with a release hole 83 for releasing the pressure of the decompression chamber 38 to the outside in response to the relief valve body 76 being detached from the relief valve seat 81 so as to open the relief valve hole 80 when the pressure of the decompression chamber 38 attains a predetermined pressure or greater.

Focusing on FIG. 1, the diaphragm 28 is formed from a disc-shaped rubber plate having a constant plate thickness for at least an inner peripheral edge part in the natural state, in this embodiment the diaphragm 28 being formed into a disc shape that has a constant thickness for its entirety in the natural state. A peripheral edge part of the diaphragm 28 is held between the second body member 19 in the body 16 and the diaphragm cover 17 fixed to the second body member 19. A pressure action chamber 86 is formed between the second body member 19 and the diaphragm 28, the outer periphery of the pressure action chamber 86 being defined by the pressure action chamber-forming hole 61 of the second body member 19, and one face of the diaphragm 28 facing the pressure action chamber 86. A spring chamber 87 is formed between the diaphragm 28 and the diaphragm cover 17, the other face of the diaphragm 28 facing the spring chamber 87. A coil-shaped diaphragm spring 88 housed in the spring chamber 87 is provided in a compressed state between the diaphragm cover 17 and the diaphragm 28.

Furthermore, the diaphragm cover 17 has connected thereto a negative pressure infeed tube 89 communicating with the spring chamber 87, this negative pressure infeed tube 89 is connected to the engine, and engine intake negative pressure is introduced into the spring chamber 87.

Referring again to FIG. 3, a central hole 90 is provided in a central part of the diaphragm 28, a diaphragm rod 91 that is made of metal and is operatively connected to the valve body 36 of the valve mechanism 20 is inserted through the central hole 90 from the pressure action chamber 86 side so that one end side thereof projects toward the spring chamber 87 side, and the other end of this diaphragm rod 91 is provided integrally with a flange-shaped first retainer 92 abutting against one face, on the pressure action chamber 86 side, of the diaphragm 28. Furthermore, the diaphragm rod 91 integrally has a cylindrical portion at one end, and this cylindrical portion is formed into an outwardly bent engagement portion 91a by swaging. At least a second retainer 93 that is made of metal and sandwiches only an inner peripheral edge part of the diaphragm 28 between itself and the first retainer 92 is held between the engagement portion 91a and the other face, on the spring chamber 87 side, of the diaphragm 28, and in this Embodiment 1 the engagement portion 91a is directly engaged with the second retainer 93. Moreover, one end of the diaphragm spring 88 abuts against the second retainer 93.

Furthermore, a diameter D3 of an outer peripheral face of the diaphragm rod 91 at least from the first retainer 92 up to an end face, on the engagement portion 91a side, of the second retainer 93 is set so as to be the same in order to determine the positions of the central hole 90 and the second retainer 93 along the radial direction of the diaphragm 28.

Incidentally, the gap between the first and second retainers 92 and 93 is restricted only by the diaphragm 28 sandwiched between the first and second retainers 92 and 93, and the gap is set so as to decrease in going radially outward. That is, the gap between the first and second retainers 92 and 93 is set so that, of the gap between the first and second retainers 92 and 93, the gap on the radially inner end side is a maximum gap Cdmax, of the gap between the first and second retainers 92 and 93, the gap on the radially outer end side is a minimum gap Cdmin, and a section with the minimum gap Cdmin is positioned further outward in the radial direction of the diaphragm 28 than a section with the maximum gap Cdmax.

In order to set such a gap between the first and second retainers 92 and 93, a face of the first retainer 92 facing the diaphragm 28 is formed in an inclined manner so that it becomes closer to the second retainer 93 in going radially outward.

Moreover, a plurality of grooves 100, 101 with a substantially V-shaped longitudinal cross-sectional shape are formed in at least one of a face, on the diaphragm 28 side, of the first retainer 92 and a face, on the diaphragm 28 side, of the second retainer 93, in this embodiment the face, on the diaphragm 28 side, of the first retainer 92, so that they bite into part of the diaphragm 28. The grooves 100 are formed in the first retainer 92 in for example the form of three concentric circles in a section, with the minimum gap Cdmin, of the gap between the first and second retainers 92 and 93, and the grooves 101 are formed in the first retainer 92 in for example the form of three concentric circles in a section, with the maximum gap Cdmax, of the gap between the first and second retainers 92 and 93.

On the other hand, a linking shaft 94 is linked to the linking shaft portion 35b of the valve shaft 35 of the valve mechanism 20, and this linking shaft 94 integrally has a large diameter shaft portion 94a having one end part abutting against the first retainer 92, a small diameter shaft portion 94b connected coaxially to one end of the large diameter shaft portion 94a so as to be inserted through an insertion hole 95 provided in the diaphragm rod 91, and a medium diameter shaft portion 94c formed with a smaller diameter than the large diameter shaft portion 94a and connected coaxially to the other end of the large diameter shaft portion 94a.

An annular seventh seal member 96 surrounding the small diameter shaft portion 94b is disposed between the first retainer 92 and the large diameter shaft portion 94a of the linking shaft 94. Furthermore, the outer periphery of at least a section of the small diameter shaft portion 94b that projects from the diaphragm rod 91 toward the spring chamber 87 side is cut with a male thread 97, and screwing a nut 99 onto the male thread 97 with a washer 98 disposed between the nut 99 and the diaphragm rod 91 and tightening it links the linking shaft 94 to a central part of the diaphragm 28 via the second retainer 93 and the diaphragm rod 91 integrally having the first retainer 92.

The linking shaft 94 extends axially movably through a central part of the wall part 58 in the second body member 19, and a guide member 104 that is made of a synthetic resin and is for guiding axial movement of the linking shaft 94 is mounted on the wall part 58.

The guide member 104 integrally has a guide portion 104a, an extended portion 104b, and engagement portions 104c, the guide portion 104a being formed into a cylindrical shape while forming a guide hole 106 into which the large diameter shaft portion 94a of the linking shaft 94 is slidably fitted, the extended portion 104b extending radially outwardly from the guide portion 104a, and the engagement portions 104c projecting from the extended portion 104b at positions spaced from the guide portion 104a. The guide member 104 is mounted on the wall part 58 of the body 16 so that one end side of the guide portion 104a is fitted into a through hole 105 provided in a central part of the wall part 58 in the second body member 19 and the engagement portions 104c resiliently engage with the wall part 58.

The extended portion 104b is formed into a flange shape while protruding radially outwardly from the entire outer periphery of an axially middle section of the guide portion 104a so as to oppose the wall part 58 from the pressure action chamber 86 side with the face opposing the wall part 58 as a flat face.

The engagement portions 104c are projectingly provided integrally with the extended portion 104b at a plurality of positions, for example three positions, equally spaced in the peripheral direction so as to surround the guide portion 104a, and are formed so as to be inserted from one face side of the wall part 58 through engagement holes 107 provided in the wall part 58 while flexing and resiliently engage with the other face of the wall part 58.

Formed in the guide member 104 so as to extend through the wall part 58 is an aspirator passage 108 providing communication between the decompression chamber 38 and the pressure action chamber 86. This aspirator passage 108 is formed within an aspirator tube 109 having one end provided integrally with the extended portion 104b. An aspirator hole 110 for the aspirator tube 109 to be fitted into is provided in the wall part 58, and the other end of the aspirator tube 109 projects into the decompression chamber 38 in a state in which the guide member 104 is mounted on the wall part 58.

The guide member 104 is provided integrally with a stopper portion 104d protruding radially outwardly from an end part, on the diaphragm 28 side, of the guide portion 104a so as to restrict displacement of the diaphragm 28 toward the side on which the volume of the pressure action chamber 86 is reduced.

The large diameter shaft portion 94a of the linking shaft 94 is slidably fitted into the guide hole 106 of the guide member 104, and an annular eighth seal member 111 in sliding contact with the inner periphery of the guide hole 106 is mounted on the outer periphery of the large diameter shaft portion 94a. Furthermore, the medium diameter shaft portion 94c in the linking shaft 94 projects into the decompression chamber 38 via the guide hole 106, and one end of the valve shaft 35 in the valve mechanism 20 is linked to the medium diameter shaft portion 94c within the decompression chamber 38.

Provided in the medium diameter shaft portion 94c in the linking shaft 94 are an engagement groove 112 that extends along a plane perpendicular to the axis of the linking shaft 94 and opens on a side face of the linking shaft 94, and a slit 113 extending between the engagement groove 112 and an end face, on the valve mechanism 20 side, of the medium diameter shaft portion 94c so as to open on a side face of the medium diameter shaft portion 94c in the same direction as the engagement groove 112.

On the other hand, an increased diameter engagement portion 35d is provided at the extremity of the linking shaft portion 35b of the valve shaft 35 on which the valve body 36 is fixedly provided, and by inserting the linking shaft portion 35b through the slit 113 so as to engage the increased diameter engagement portion 35d with the engagement groove 112 the valve shaft 35 of the valve mechanism 20 is linked to one end of the linking shaft 94. That is, the linking shaft 94 is connected to the valve body 36 via the valve shaft 35.

In such a decompression valve for gas, when the diaphragm 28 flexes toward the spring chamber 87 side against the spring force of the diaphragm spring 88 by virtue of the pressure of the pressure action chamber 86, the valve mechanism 20 closes, when the diaphragm 28 flexes toward the pressure action chamber 86 side as a result of reduction in the pressure of the pressure action chamber 86, the valve mechanism 20 opens, and repeating such opening and closing of the valve mechanism 20 decompresses high pressure compressed natural gas and outputs it via a gas outlet 114.

The gas outlet 114 is provided in the second body member 19 so that its inner end opens on an inner face of the decompression chamber-forming hole 59 on the same axis as the relief valve 21. That is, the gas outlet 114 communicates with the decompression chamber 38, and a connecting tubular part 115 forming the gas outlet 114 is provided integrally with the second body member 19 so as to project sideways from the second body member 19.

Figure 6:
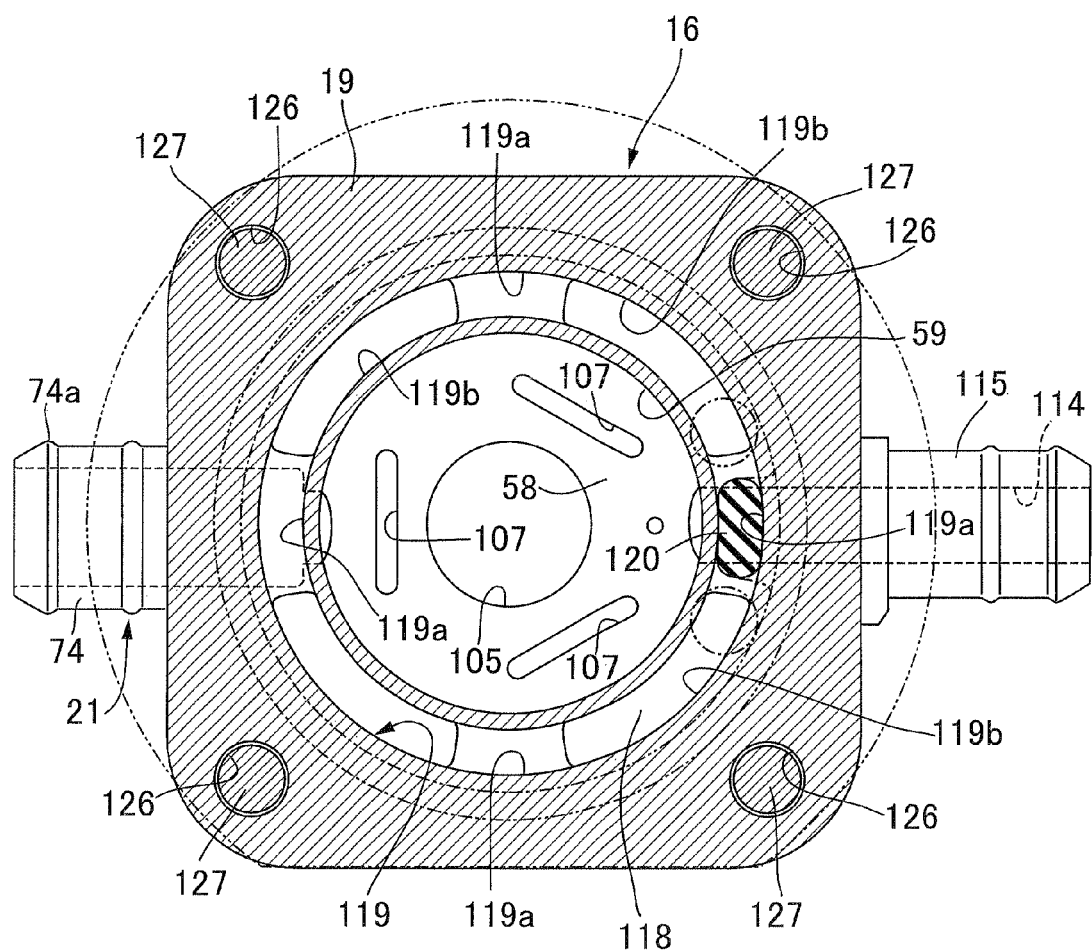
FIG. 6 is a sectional view taken along a line 6-6 in FIG. 1. (first embodiment)
Figure 7:
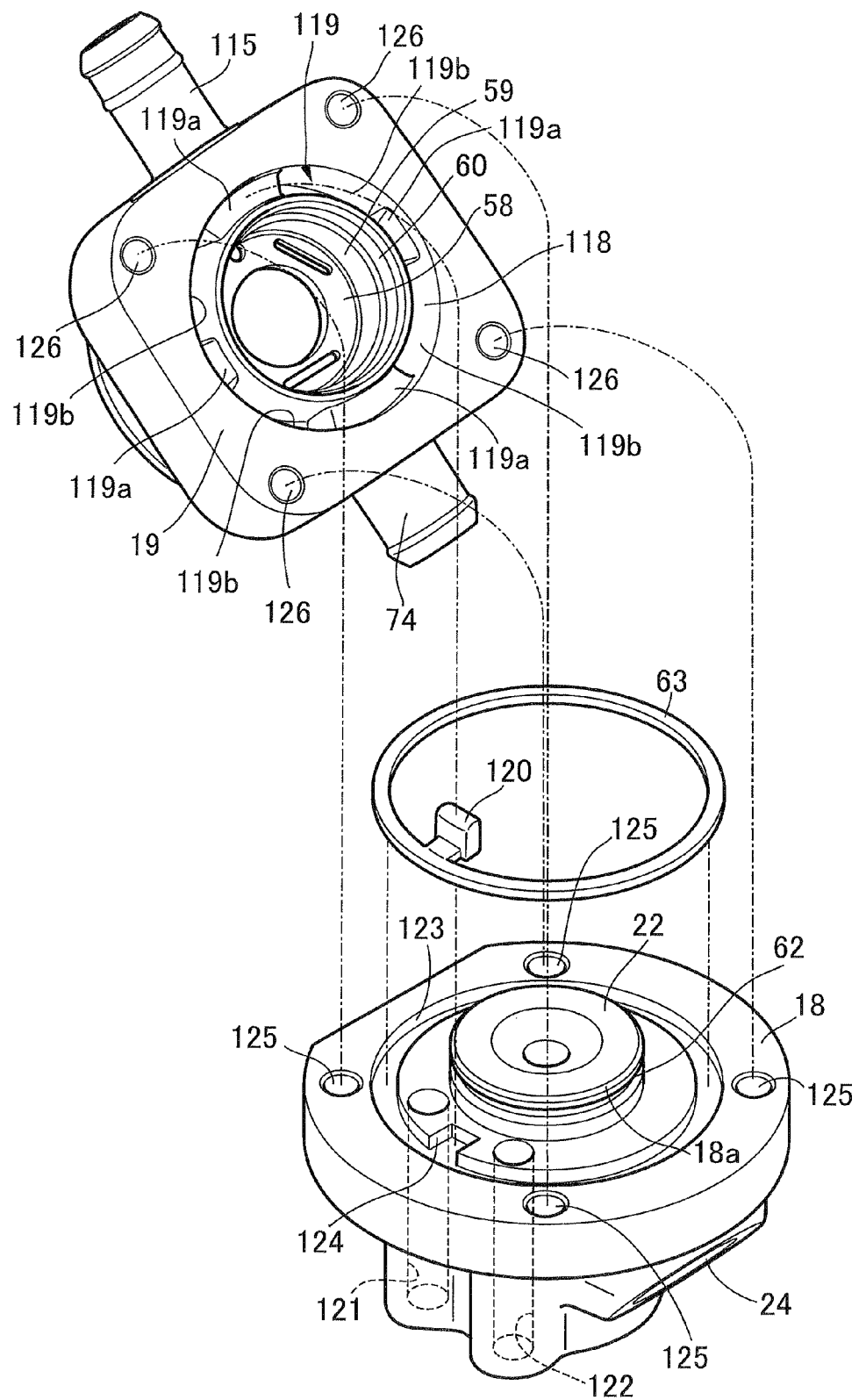
FIG. 7 is an exploded perspective view of first and second bodies. (first embodiment)

Referring in addition to FIG. 6 and FIG. 7, in a state in which the first and second body members 18 and 19 are joined, a heated medium passage 118 through which a heated medium, for example, engine cooling water circulates, is formed between joined faces of the first and second body members 18 and 19, and the sixth seal member 63, which is an annular resilient seal member surrounding the heated medium passage 118 from the outside, is sandwiched between the first and second body members 18 and 19.

This heated medium passage 118 is formed into an arc shape surrounding the valve body 36 and the valve seat 34 when viewed in a direction along the axis of the valve shaft 35 in the valve mechanism 20 and is positioned at substantially the same position as the valve seat 34 in a direction along the axis of the valve shaft 35. A circular groove 119 for forming the heated medium passage 118 is provided in at least one of the joining faces of the first and second body members 18 and 19, in this Embodiment 1 in the face of the second body 19 joined to the first body member 18, and the arc-shaped heated medium passage 118 is formed by partitioning one position in the peripheral direction of this groove 119 by means of a dividing wall 120.

Incidentally, provided in the first body member 18 so as to extend in parallel to the axis of the valve shaft 35 in the valve mechanism 20 are a medium inlet passage 121 communicating with one end, in the peripheral direction, of the heated medium passage 118 and a medium outlet passage 122 communicating with the other end, in the peripheral direction, of the heated medium passage 118.

Furthermore, provided in a face of the first body member 18 via which it is joined to the second body member 19 is an annular seal fitting groove 123 for fitting the sixth seal member 63, and provided in the first body member 18 is a dividing wall fitting groove 124 extending radially inward from the seal fitting groove 123 at a position corresponding an area between the medium inlet passage 121 and the medium outlet passage 122.

The dividing wall 120 is provided integrally with the sixth seal member 63 so as to extend radially inward from one position in the peripheral direction of the sixth seal member 63, and the dividing wall 120 is fitted in the dividing wall fitting groove 124 when the sixth seal member 63 is fitted in the seal fitting groove 123. This positions and fixes the dividing wall 120 to, among the first and second body members 18 and 19, the first body member 18 side, in which the medium inlet passage 121 and the medium outlet passage 122 are provided.

The dividing wall 120 positioned and fixed to the first body member 18 side is fitted into the groove 119 on the second body member 19 side when the first and second body members 18 and 19 are joined, thus forming the arc-shaped heated medium passage 118 by partitioning at one position in the peripheral direction of the groove 119 in an area between the medium inlet passage 121 and the medium outlet passage 122.

Incidentally, bolt insertion holes 125 are provided at a plurality of positions, for example 4 positions, equally spaced in the peripheral direction of the first body member 18, and threaded holes 126 individually corresponding to the bolt insertion holes 125 are provided in the second body 19. By screwing bolts 127, inserted through the bolt insertion holes 125, into the threaded holes 126 and tightening, the first and second body members 18 and 19 are joined to each other. The first and second body members 18 and 19 are therefore joined so as to take a plurality of relative attitudes that have varied relative positions in the peripheral direction, in this Embodiment 1 four relative attitudes that have varied relative positions in the peripheral direction.

The groove 119 is formed from a plurality of, for example four, shallow groove portions 119a, and a plurality of, for example four, deep groove portions 119b disposed between the shallow groove portions 119a, and in this Embodiment 1 the mutually corresponding bolt insertion holes 125, 126 are provided at four positions equally spaced in the peripheral direction of the first and second body members 18 and 19 respectively. Four of the shallow groove portions 119a are accordingly disposed equally spaced in the peripheral direction, and the dividing wall 120 is selectively fitted into one of the shallow groove portions 119a.

Figure 8:
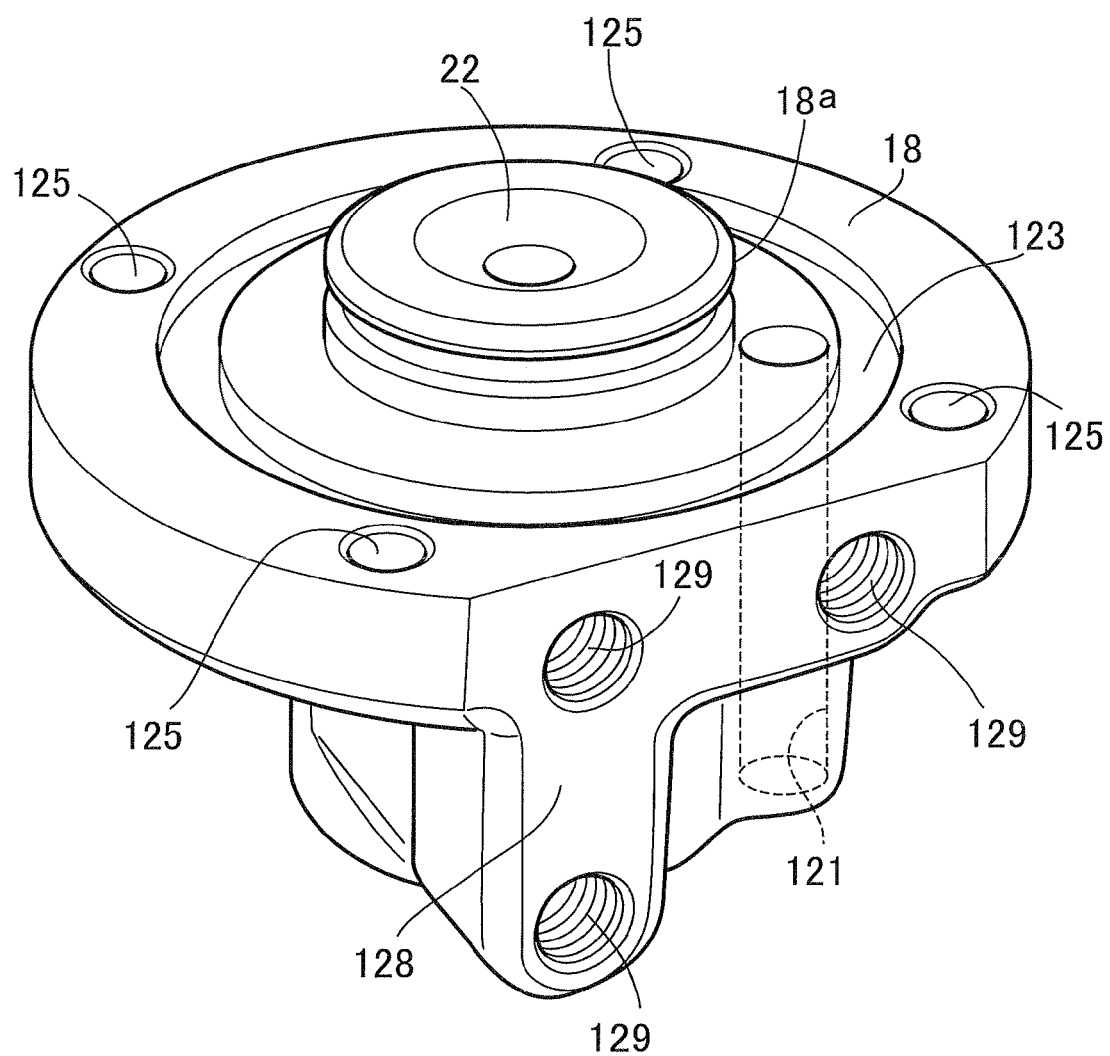
FIG. 8 is a perspective view of a first body member in order to show a part that is to be mounted. (first embodiment)

In FIG. 8, provided on a side face of the first body member 18 is a flat mounting part 128 that is to be mounted on a vehicle body, which is a fixed support body, when mounted on a vehicle, and provided in this mounted part 128 are a plurality of, for example three, bolt holes 129.

Operations of this Embodiment 1 are now explained. Since the synthetic resin valve body 36 is fitted around the outer periphery of the metal valve shaft 35, with which the valve mechanism 20 is equipped, so as to allow between itself and the valve shaft 35 circulation of fluid between the valve chamber 32 and the back pressure chamber 65, and the annular third seal member 46 present between the valve chamber 32 and the back pressure chamber 65 is disposed between the outer periphery of the valve body 36 and the guide member 30 fixed to the first body member 18 of the body 16 so as to guide axial movement of the valve shaft 35, it is unnecessary for a sealing member for providing sealing between the valve chamber 32 and the decompression chamber 38 to be disposed between the valve shaft 35 and the valve body 36, thus decreasing the number of components and thereby reducing the cost. Moreover, since a sealing member is not disposed between the valve body 36 and the valve shaft 35, the shapes of the outer periphery of the valve shaft 35 and the inner periphery of the valve body 36 can be simplified.

Moreover, since the third seal member 46 is mounted on the guide member 30 so as to be in resilient sliding contact with the outer periphery of the valve body 36, it becomes unnecessary to provide a groove, etc. for mounting a seal member on the valve body 36 side, thus simplifying the shape of the valve body 36.

Furthermore, the valve body mounting shaft portion 35a having on the outer periphery of one end the retaining groove 43 with which the valve body 36 is engaged is provided on part of the metal valve shaft 35 so that the valve body 36 is fitted thereto, and this valve body mounting shaft portion 35a is formed so as to have the same cross-sectional shape along the whole length in the axial direction apart from the retaining groove 43. Accordingly, when making the valve shaft 35 by machining a metal substrate, it is possible to reduce the portion that is removed by machining, thus achieving a reduction in processing cost and material cost.

Moreover, since the first cutout 69, forming between the valve body 36 and the valve shaft 35 the first passage part 67, which is part of the back pressure infeed path 66 providing a connection between the decompression chamber 38 and the back pressure chamber 65, is provided so as to extend in the axial direction on at least one of the inner periphery of the valve body 36 and the outer periphery of the valve shaft 35, in this Embodiment 1 on the outer periphery of the valve shaft 35, it is possible to form the back pressure infeed path 66 simply and inexpensively, and it is unnecessary to ensure there is space for forming the back pressure infeed path on the first body member 18 side, thus achieving a reduction in the size of the body 16.

Furthermore, since the valve shaft 35 integrally has the guide shaft portion 35c slidably fitted into the guide hole 45 provided in the guide member 30, and the second cutout 70 forming, between the guide member 30 and the valve shaft 35, the second passage part 68 forming part of the back pressure infeed path 66 and providing a connection between the first passage part 67 and the back pressure chamber 65 is provided so as to extend in the axial direction on at least one of the outer periphery of the guide shaft portion 35c and the inner periphery of the guide hole 45, in this Embodiment 1 on the outer periphery of the guide shaft portion 35c, the back pressure infeed path 66 can be formed simply together with the first passage part 67.

Moreover, since the guide hole 45 is formed so as to have a smaller diameter than the sealing diameter D1 of the valve body 36 by the third seal member 46, even if the ratio (sliding section length/guide diameter) of the guide diameter D2, which is the diameter of the guide hole 45 for guiding the valve body 36 and the valve shaft 35, and the length of the sliding section of the valve shaft 35 is ensured so as not to cause tilting and galling of the valve shaft 35 and the valve body 36, a short length can be set for the sliding section, thus achieving a reduction in the size of the decompression valve. That is, in order to prevent the occurrence of tilting and galling of the valve shaft 35 and the valve body 36, the sliding section length/guide diameter is generally set at a given value or greater, and the sliding section length can be made small by setting a small guide diameter. Moreover, even when the guide diameter D2 and the sealing diameter D1 are different, since the back pressure infeed path 66 is formed between the valve shaft 35 and the valve body 36 and between the valve shaft 35 and the guide member 30, it is possible to apply back pressure to the entire end faces of the valve shaft 35 and the valve body 36 on the side opposite to the diaphragm 28 by means of a simple arrangement.

Furthermore, since the valve body 36 is formed from a synthetic resin, it is possible to ensure the durability against high pressure and the seating properties of the valve body 36 and, moreover, since the valve mechanism 20 decompresses compressed natural gas, the synthetic resin valve body 36 can be used most suitably.

Incidentally, the relief valve 21 for releasing to the outside the pressure of the decompression chamber 38 by opening in response to the pressure of the decompression chamber 38 attaining a predetermined pressure or greater is disposed on the second body member 19 of the body 16. This relief valve 21 includes: the cylindrical joint part 74 formed into a cylindrical shape so that a hose can be connected thereto and provided integrally with the second body member 19 of the body 16 while having formed on the outer periphery the retaining portion 74a retaining the hose; the relief valve body 76, which is slidably fitted into the slide hole 75 coaxial with the joint part 74; the cap 77 fitted and fixed to the outer end part of the slide hole 75; and the coil spring 78 provided between the relief valve body 76 and the cap 77. The annular relief valve seat 81 that enables the relief valve body 76 resiliently urged by the coil spring 78 to be seated thereon is formed at the inner end of the slide hole 75 with the relief valve hole 80 communicating with the decompression chamber 38 opening in its central part, and the release hole 83 for releasing to the outside the pressure of the decompression chamber 38 in response to opening of the relief valve hole 80 by the relief valve body 76 detaching from the relief valve seat 81 is provided in the cap 77.

Therefore, compared with a relief valve assembled by press fitting, etc. of a valve housing to a body, the number of components and the number of assembly steps can be reduced and, furthermore, since the joint part 74 is formed into a cylindrical shape so that a hose can be connected thereto and the retaining portion 74a is formed on the outer periphery of the joint part 74, compared with an arrangement in which a separate joint member is connected, the number of components and the number of assembly steps can be reduced, thereby achieving a reduction in cost. Moreover, connecting a hose to the joint part 74 enables the discharge position where gas is discharged accompanying opening of the relief valve 21 to be set freely by means of the hose.

Furthermore, the diaphragm 28 has the central hole 90 in its central part and is formed into a disc shape with the plate thickness of at least the inner peripheral edge part constant in the natural state. The metal diaphragm rod 91, which integrally has the flange-shaped first retainer 92 abutting against the inner peripheral edge part of one face of the diaphragm 28 and is operatively connected to the valve body 36 of the valve mechanism 20, is inserted through the central hole 90 of the diaphragm 28. At least the metal second retainer 93 sandwiching only the inner peripheral edge part of the diaphragm 28 between itself and the first retainer 92 is held between the inner peripheral edge part of the other face of the diaphragm 28 and the engagement portion 91a formed by swaging one end of the diaphragm rod 91. In this Embodiment 1 the engagement portion 91a is engaged directly with the second retainer 93.

It is therefore possible to achieve a reduction in cost by using the diaphragm 28, which is formed into a disc shape with the plate thickness of at least the inner peripheral edge part constant in the natural state. Furthermore, compared with a screw fastening structure employing a nut, the mass-productivity is high, it is unnecessary to take into consideration loosening of a screw, and the reliability of the structure by which the inner peripheral edge part of the diaphragm 28 is held between the first and second retainers 92 and 93 is improved.

Moreover, since the outer peripheral face diameter D3 of the diaphragm rod 91 at least from the first retainer 92 to the end face, on the engagement portion 91a side, of the second retainer 93 is set so as to be the same in order to determine the positions of the central hole 90 and the second retainer 93 along the radial direction of the diaphragm 28, part of the inner peripheral edge part of the diaphragm 28 does not ride over a member other than the first and second retainers 92 and 93 when assembly is carried out, and a compression allowance for the diaphragm 28 can be set at a desired value.

Moreover, of the gap between the first and second retainers 92 and 93 restricted only by the diaphragm 28, a section with the minimum gap Cdmin is positioned radially further outward than a section with the maximum gap Cdmax. The sealing properties between the diaphragm 28 and the first and second retainers 92 and 93 can be enhanced by the diaphragm 28 being compressed between the first and second retainers 92 and 93 in the section with the minimum gap Cdmin with a relatively large load. Of the gap between the first and second retainers 92 and 93 it is necessary to compress a section that is further inside than the section with the minimum gap Cdmin when passing through the section with the minimum gap Cdmin. By virtue of the load from the engagement portion 91a formed by swaging one end of the diaphragm rod 91 toward the inner peripheral sides of the first and second retainers 92 and 93 the second retainer 93 flexes so as to exhibit a resilient force on the side on which the gap between first and second retainers 92 and 93 on the outer peripheral side decreases. Accordingly, even if the resilient force of the diaphragm 28 is decreased due to degradation thereof, it is possible to improve the load of the resistance to coming out.

Incidentally, the arc-shaped heated medium passage 118 for circulating heated medium is formed between the joining faces of the first and second body members 18 and 19 forming the body 16 so as to surround the valve body 36 and the valve seat 34 when viewed in a direction along the axis of the valve body 36 in the valve mechanism 20; the circular groove 119 for forming the heated medium passage 118 is provided in at least one of joining faces of the first and second body members 18 and 19, in this Embodiment 1 in the face of the second body member 19 joined to the first body member 18; the medium inlet passage 121 and the medium outlet passage 122 communicating with opposite end parts of the heated medium passage 118 are provided in the first body member 18; and the dividing wall 120 partitioning the circular groove 119 between the medium inlet passage 121 and the medium outlet passage 122 is positioned and fixed to the first body member 18.

Therefore, even if the relative positions in the peripheral direction of the body members 18 and 19 are changed, the position of the dividing wall 120 relative to the medium inlet passage 121 and the medium outlet passage 122 can be set so as to be constant, and the positions of the medium inlet passage 121 and the medium outlet passage 122 are set at opposite end positions of the arc-shaped heated medium passage 118. Accordingly, heated medium can be circulated effectively, and it is unnecessary to prepare a plurality of types of body members in which the position of a dividing wall is varied, thus reducing the cost and also excluding the possibility of erroneous assembly occurring.

Furthermore, since the mounted part 128 for mounting the body 16 on a fixed support body such as a vehicle body is provided on the first body member 18, which is one of the first and second body members 18 and 19, and the gas outlet 114 communicating with the decompression chamber 38 is provided on the second body member 19, which is the other of the first and second body members 18 and 19, the direction of opening of the gas outlet 114 when the body 16 is mounted on a vehicle body, etc. can be changed to a desired direction.

Moreover, since the dividing wall 120 is provided integrally with the annular sixth seal member 63, which is held between the joining faces of the first and second body members 18 and 19 and seals the heated medium passage 118 from the outside, it is possible to avoid any increase in the cost of forming the body and in the number of components due to provision of the dividing wall 120, the dividing wall 120 can thereby be formed simply and at a low cost, and it becomes possible to reliably provide a seal between opposite ends of the heated medium passage 118 by fitting the dividing wall 120 into the groove 119.

Furthermore, the groove 119 has a plurality of shallow groove portions 119*a* and a plurality of deep groove portions 119*b* disposed between the shallow groove portions 119*a*, and the arc-shaped heated medium passage 118 is formed by the dividing wall 120 being selectively fitted into one of the shallow groove portions 119*a* so as to partition the groove 119. Accordingly, although the dividing wall 120 has elasticity and thus low rigidity and easily tilts, due to the dividing wall 120 being fitted into the shallow groove portion 119*a* of the groove 119 it becomes easy to maintain the rigidity of the dividing wall 120, thus making it easy to control the allowance for securing the dividing wall 120.

An embodiment of the present invention is explained above, but the present invention is not limited to the above embodiment and may be modified in a variety of ways as long as the modifications do not depart from the gist thereof.

The invention claimed is:

1. A decompression valve in which a valve mechanism housed in a body comprises a valve body that can be seated on a valve seat facing a valve chamber into which high pressure fluid is introduced, and a valve shaft that has one end linked to a pressure receiving member operable in association with pressure of a decompression chamber communicating with a valve hole surrounded by the valve seat and that extends through the valve hole while having the other end facing a back pressure chamber communicating with the decompression chamber, the valve body being fitted around the outer periphery of the valve shaft, wherein the valve body is fitted around the outer periphery of the valve shaft while allowing circulation of fluid between the valve chamber and the back pressure chamber via a space between the valve body and the valve shaft, and an annular seal member present between the valve chamber and the back pressure chamber is disposed between a guide member and the outer periphery of the valve body, the guide member being fixed to the body so as to guide movement, in an axial direction, of the valve shaft, wherein the seal member is mounted on the guide member to be in resilient sliding contact with the outer periphery of the valve body, a valve body mounting shaft portion having a retaining groove on an outer periphery of one end thereof is provided in part of the valve shaft, and the valve body is fitted over the valve body mounting shaft portion and resiliently engages with the retaining groove at an annular projection provided at one end thereof, the valve body mounting shaft portion is formed so as to have the same cross-sectional shape over a whole axial length thereof apart from a section of the retaining groove, and a main portion of the valve body including the portion placed in sliding contact with the seal member has a thickness smaller than that of the seal member.

2. The decompression valve according to claim 1, wherein the valve shaft is made of metal.

3. The decompression valve according to claim 1, wherein said space comprises a first cutout which is provided so as to extend in the axial direction on at least one of the inner periphery of the valve body and the outer periphery of the valve shaft, the first cutout forming a first passage part between the valve body and the valve shaft, and the first passage part being part of a back pressure infeed path providing a connection between the decompression chamber and the back pressure chamber.

4. The decompression valve according to claim 3, wherein the valve shaft integrally has a guide shaft portion slidably fitted into a guide hole provided in the guide member, and a second cutout is provided so as to extend in the axial direction on at least one of the outer periphery of the guide shaft portion and the inner periphery of the guide hole, the second cutout forming a second passage part between the guide member and the valve shaft, and the second passage part forming part of the back pressure infeed path and providing a connection between the first passage part and the back pressure chamber.

5. The decompression valve according to claim 4, wherein the guide hole is formed so as to have a smaller diameter than a sealing diameter of the valve body by the seal member.

6. The decompression valve according to claim 1, wherein the valve body is formed from a synthetic resin.

7. The decompression valve according to claim 6, wherein high pressure compressed natural gas is introduced into the valve chamber.

* * * * *